May 17, 1955 — L. DE FRANCES — 2,708,460
PRODUCTION OF SPRING PAD STRUCTURES
Filed Oct. 1, 1952 — 6 Sheets-Sheet 1
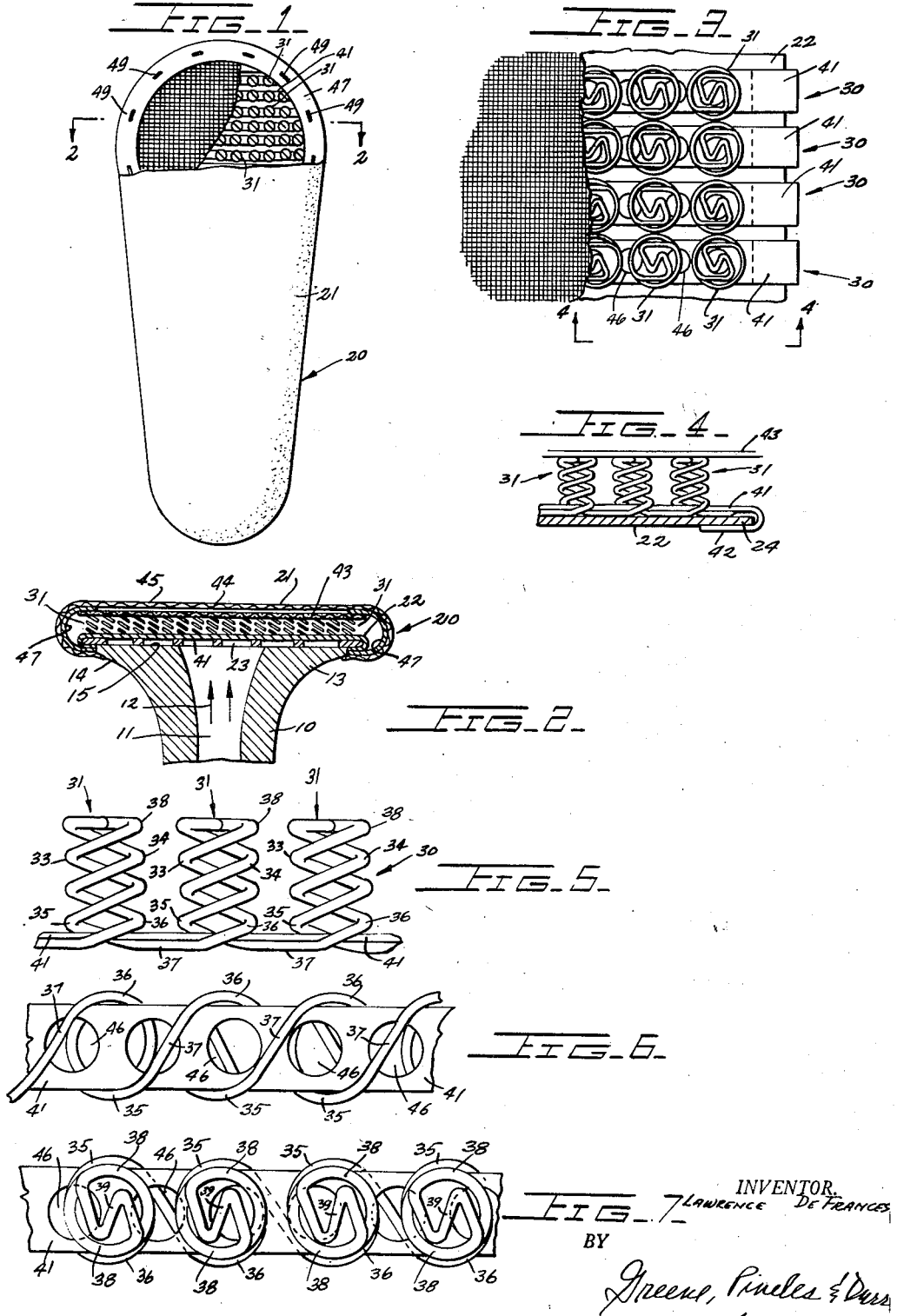

May 17, 1955
L. DE FRANCES
2,708,460
PRODUCTION OF SPRING PAD STRUCTURES
Filed Oct. 1, 1952
6 Sheets-Sheet 2
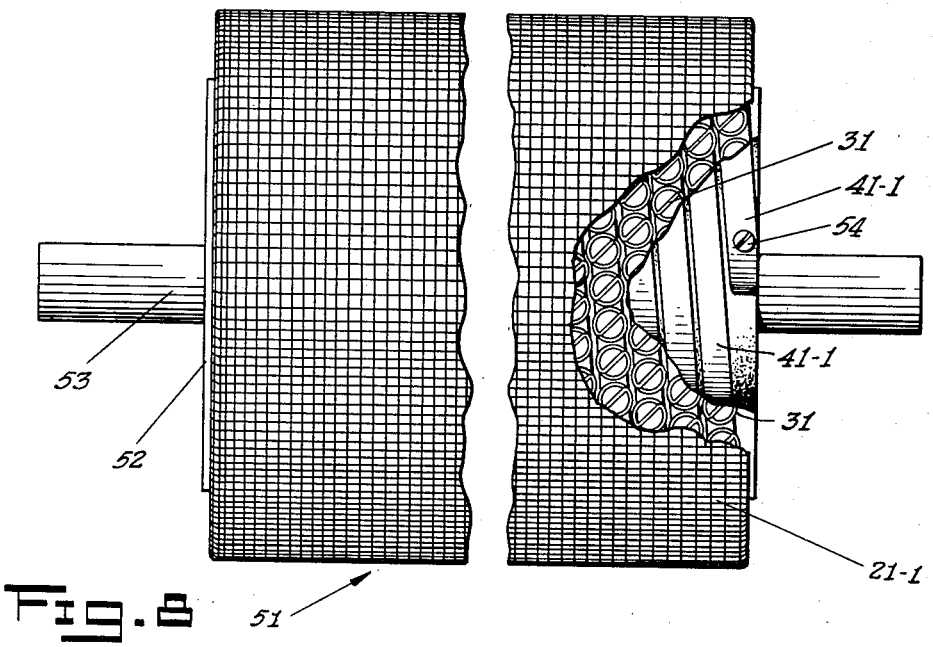
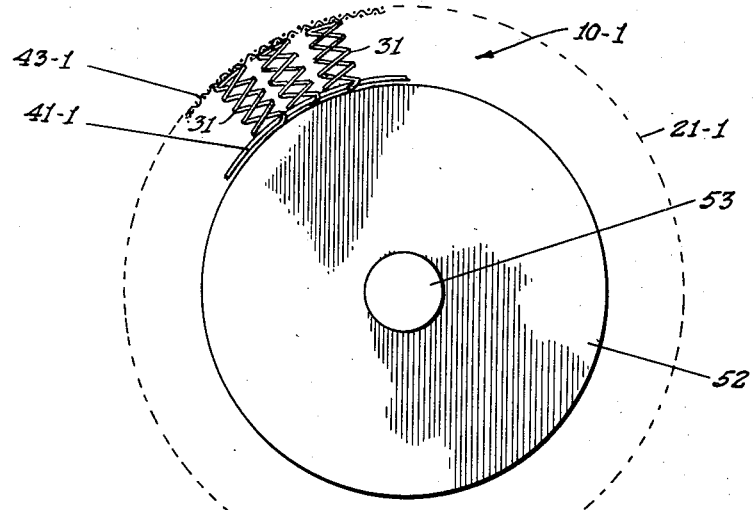
INVENTOR.
LAWRENCE DE FRANCES
BY
Edward T. Connors
ATTORNEY.

May 17, 1955     L. DE FRANCES     2,708,460
PRODUCTION OF SPRING PAD STRUCTURES

Filed Oct. 1, 1952     6 Sheets-Sheet 3

INVENTOR.
LAWRENCE DE FRANCES
BY Edward T. Connors
ATTORNEY

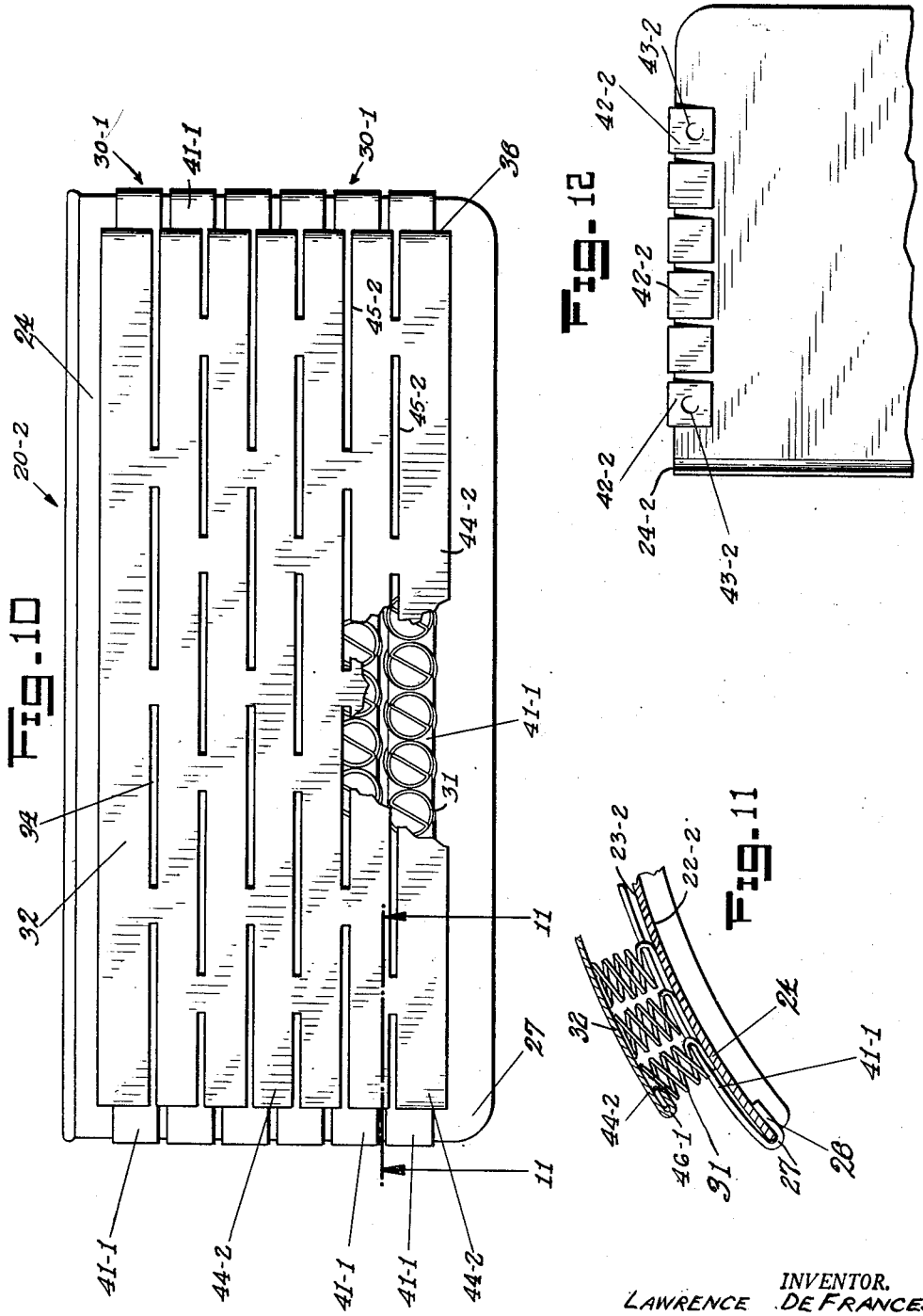

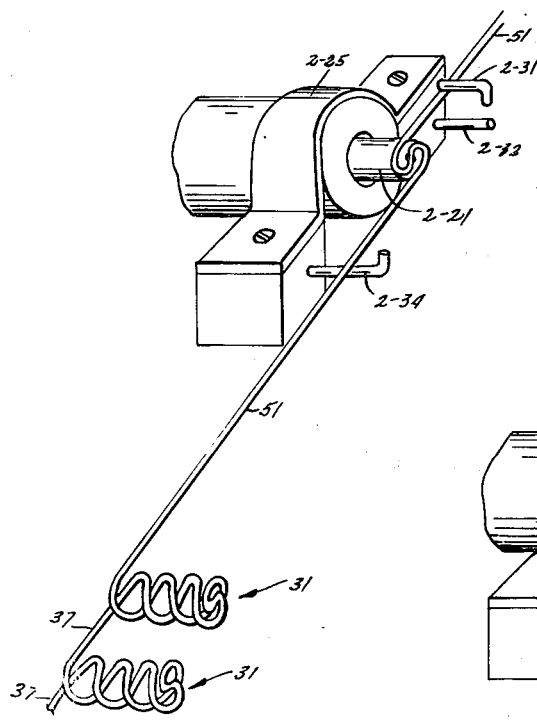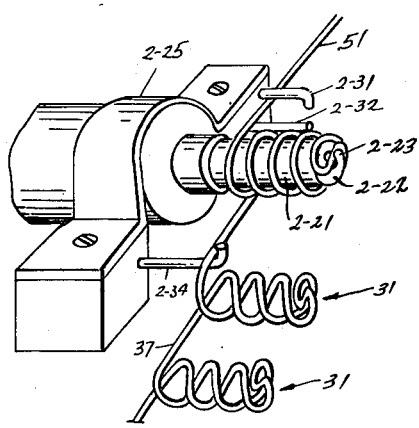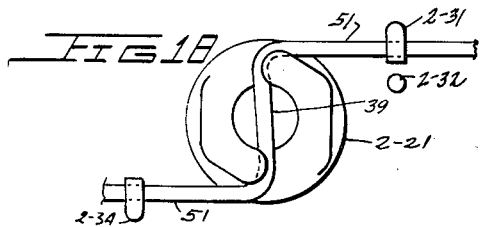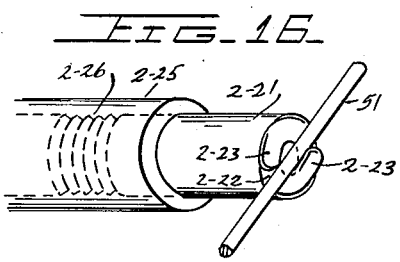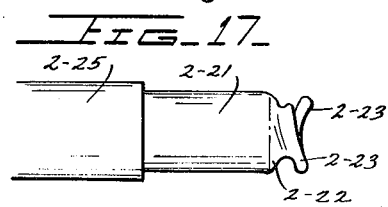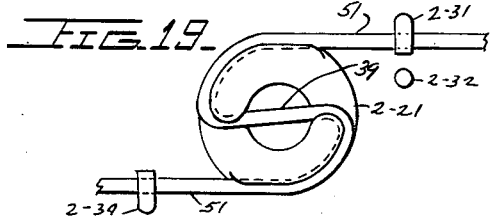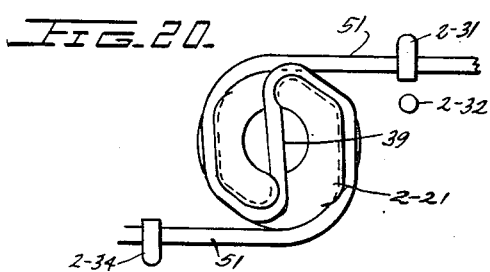

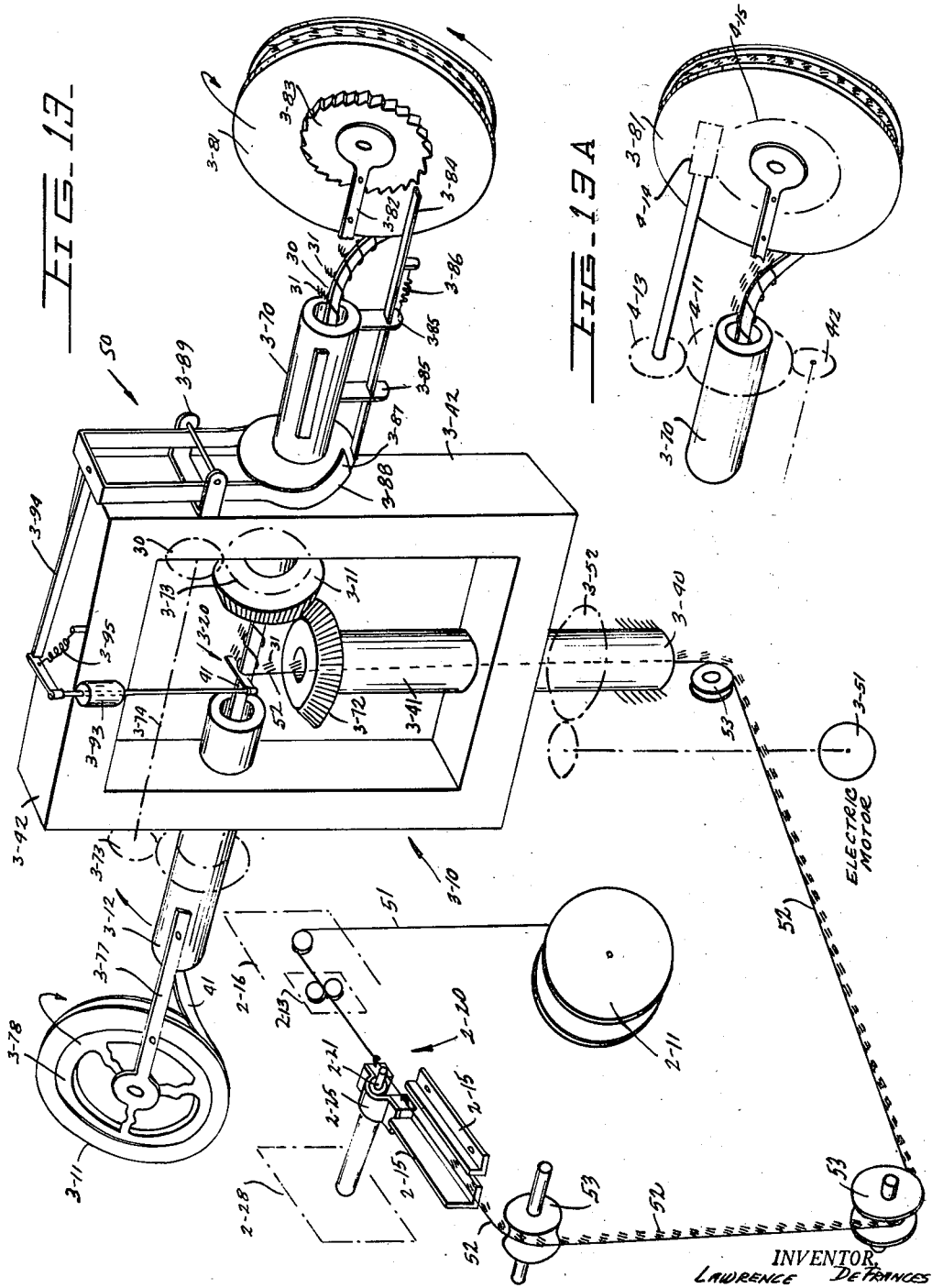

---

United States Patent Office 2,708,460
Patented May 17, 1955

---

2,708,460

PRODUCTION OF SPRING PAD STRUCTURES

Lawrence De Frances, Bronx, N. Y., assignor to Zeidler Manufacturing Company, Inc., White Plains, N. Y., a corporation of New York Application October 1, 1952, Serial No. 312,486

9 Claims. (Cl. 140—2)

This invention relates to spring support structures and their manufacture. Although originally devised for use as spring pads for garment and laundry ironing machines and the like, the spring support structures of the invention have many other applications including bed mattress springs, box springs which serve as supports for the bed mattress, and various other spring support structures which provide a generally similar spring support for an extended surface.

When pressing an article such as a garment or laundry article, it is essential that the extended surface of the article be pressed smoothly so that it presents a smooth, neat surface appearance. The desired smooth surface appearance is achieved by ironing or pressing the article with a comparatively heavy pressure applied evenly over a large surface of the article, supported by the extended surface of a backing support or pressing pad. Difficulties arise when the desired heavy ironing pressure is applied to articles such as garments fitted with buttons and like projecting elements and unless a resilient pressing pad is utilized, the buttons are easily broken or bent by the pressing pressure applied to such article.

In accordance with the invention, the desired spring pads or spring support with an extended spring support surface is obtained by forming out of consecutive lengths of a continuous elongated wire-like elastic metallic spring member a large number of bifilary helically wound spring coils projecting outwardly from a common base level as a row or strip of adjacent coils.

Adjacent sections of such strip of bifilary coil springs of the invention are arrayed in side by side relation to form with their freely projecting coil ends the desired extended spring support surface which provides a firm support for an extended surface of an article to be pressed while permitting individual projecting article elements of the pressed article to displace inwardly the outward end of an individual coil spring without damage to the pressed article or to the coil spring support.

In each row or strip of bifilary spring coils of the invention, each helical bifilary coil has one filar base turn ending at the base level on one side of the row and another filar base turn ending at the base level on the opposite side of the row with the end portion of one filar base turn connected to the oppositely directed end portion of the opposite filar base turn of the adjacent coil of the row by a transverse coil junction extending transversely to the coil row. The two opposite filary base turns of each coil of the coil row are restrained against movement with respect to a common base level by positioning an elongated strip-like flat metallic backing member, which is relatively rigid in the plane of its flat surfaces, between the transverse coil junctions of the adjacent coils of the row and the adjacent opposite filar base turns of each coil of the row.

It is among the objects of the invention to provide a novel process for forming a composite ribbon-like bifilary coil spring support structure suitable for forming spring support pads and the generally similar spring support structures.

The foregoing and other objects of the invention will be best understood from the following description of exemplifications thereof, reference being had to the accompanying drawings, wherein:

Fig. 1 is a plan top view partly broken away of the upper portion of an elongated pressing block of a conventional garment pressing machine equipped with a spring support or pad structure exemplifying the invention;

Fig. 2 is a cross-section along lines 2—2 of Fig. 1;

Fig. 3 is a view similar to Fig. 1 showing enlarged a portion of the spring pad structure thereof;

Fig. 4 is a cross-sectional view along lines 4—4 of Fig. 3;

Fig. 5 is a side elevational view of a portion of one elongated multiple coil spring strip structure of the pad of Figs. 1 to 4;

Figs. 6 and 7 are bottom and top views, respectively, of the spring structure of Fig. 5;

Fig. 8 is an elevational view partly broken away of a pressing roller of a conventional pressing machine equipped with a circular spring pad support exemplifying the invention;

Figure 9A:
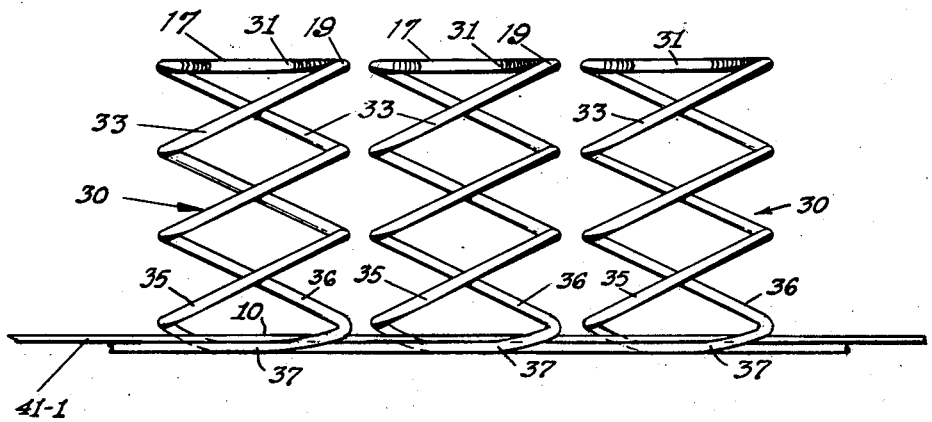
Fig. 9 is an end view partially diagrammatic and partially broken away of the roller of Fig. 8.
Figure 9B:
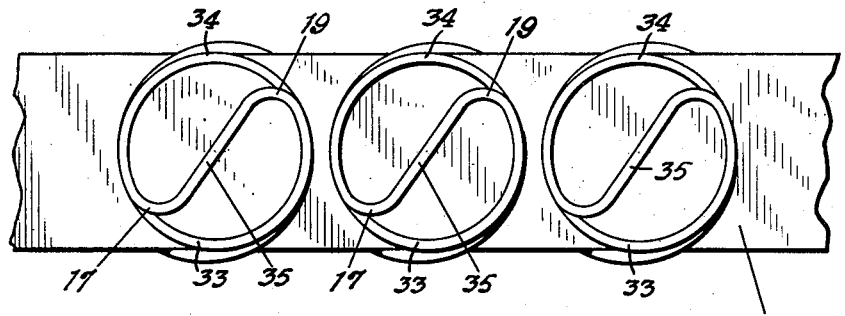
Figure 9C:
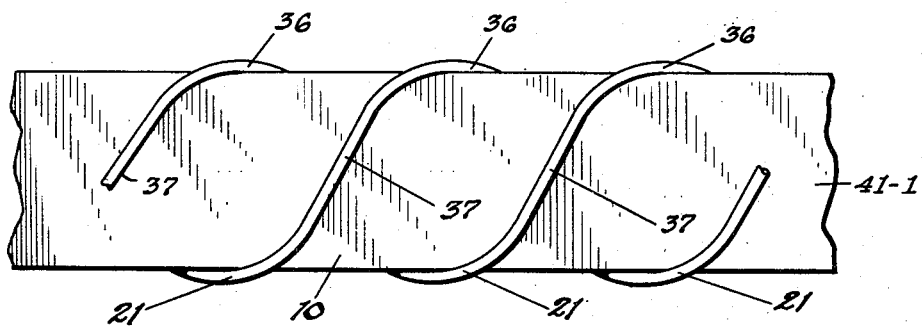

Fig. 9–A is an enlarged side view of a portion of the multiple coil spring strip structure of the pad of Figs. 8 and 9;

Figs. 9–B and 9–C are top and bottom views respectively of the multiple coil spring strip structure of Fig. 9–A;

Fig. 10 is a plan top view partly broken away of the upper portion of a modified form of a pressing block of a garment press with a spring pad structure exemplifying the invention;

Fig. 11 is a cross-sectional view along lines 11—11 of Fig. 10;

Fig. 12 is a bottom view of one end portion of the spring pad shown in Figs. 10 and 11;

Fig. 13 is a partially diagrammatic and partially phantom view of one form of production equipment for forming on a continuous production basis a multiple coil spring strip of the type shown in Figs. 1 to 12 in accordance with a production method exemplifying the invention;

Fig. 13A is a partial view of a modified form of the storing mechanism.

Fig. 14 is a perspective view of parts of the equipment of Fig. 13;

Fig. 15 is a view similar to Fig. 14 of the same equipment parts in another production stage;

Fig. 16 is a perspective view similar to Fig. 14 showing enlarged the rotary coil forming member of the same production equipment;

Fig. 17 is a side elevational view of the coil forming member of Fig. 16; and

Figs. 18, 19 and 20 are end views of the coil forming member of Figs. 15, 16 and the associated elements of the production equipment in three stages of the coil forming process.

Although spring support structures of the invention and their manufacture have many other uses, they will be described herein in their specific application as backing supports or support pads for garment pressing machines or laundry pressing machines.

Figs. 1 and 2 show the upper part of the conventional buck block 10 or buck as it is conventionally called, of a conventional garment pressing machine provided at its upper surface with an elongated backing support or spring pad generally designated 20. The spring pad backing support 20 has an extended upper backing surface 21 which is arranged to operate as a generally extended support for a large part of an overlying garment which is being pressed thereon by the applied pressure of an overlying large pressing head having a relatively large heated pressing area substantially coextensive with and complementary to the exposed backing surface 21 of the spring pad 20.

The buck 20 is of conventional construction being made for instance of cast metal, and it has in its interior a discharge passage 11 for die charging therethrough steam in the direction of the arrows 12 by way of the large area outlet formed in its upper buck end region 13 having a shape corresponding to the elongated area of the spring pad 20.

The spring pad 20 is formed of a relatively strong backing frame member 22, of strong sheet metal for instance, having an elongated shape and a border conforming to the shape and border of the spring pad 20 and the underlying upper buck end region 13 to which it is secured. The sheet-like frame member 22 of the spring pad 20 is secured to the underlying end region 13 of the buck in any conventional way, for instance, by providing the sheet frame member 22 at four spaced peripheral regions with metallic finger projections (not shown) fitting against the border edges of the buck end region 13, the metallic fingers not shown being bent under the border lip 14 of the buck end region 13 so as to remain firmly attached and coupled against the upper surface 15 of the buck. The sheet frame member 22 of the spring pad 20 is provided with perforations or holes 23 for admitting therethrough steam discharged through the buck passage 11 into the upper region of the spring pad 20.

To the upper surface of the sheet-like supporting frame 22 of the spring pad 20 are secured a plurality of rows or strips of spring elements generally designated 30, a portion of one strip 30 of such spring elements being shown in detail in Figs. 5, 6, 7. Each strip of spring elements 30 comprises a large number of adjacent helically wound bifilary coils, generally designated 31 formed of a continuous length of resilient metal wire which exhibits substantial stiffness. Although the wire of the coils 31 shown is of circular cross-section, such series of adjacent bifilary coils of the invention may be formed of a resilient metal wire having another cross-section such as a rectangular or triangular cross-section. Any suitable elastic metal may be used for the coil rows 30 of the type shown in Figs. 5 to 7, such as wire of carbon steel plated with a corrosion-resistant coating such as nickel cadmium or chromium or corrosion-resistant metal wire such as a wire of stainless steel, beryllium copper or the like.

As shown specifically in Figs. 5, 6, 7, each bifilary spring wire coil 31 (of the strip-like coil row 30) projects outwardly from a common base level provided by the transversely extending coil junction elements 32 which connect the individual coils to each other and form with them parts of a continuous wire. Each bifilary coil comprises two helically wound filary coil helices 33, 34 extending from a common filary outer junction element 39 at the outer end of each coil 31. Each filary coil helix 33, 34 of each spring coil 31 ends in a base coil turn 35, 36 respectively, and the two base coil turns 35, 36 are disposed at the common base level of the coil junctions 32 of the multiple coil strip 30, with one base turn of each coil 31, such as base turn 35 ending on one side of the coil or strip row 30 and the other base turn 36 ending on the opposite side of the coil or strip row 30. Furthermore, the end portion of one base turn 35 of one of the coils 31 (of each coil strip 30) is connected to the oppositely directed end portion of the opposite base turn 36 of the next adjacent coil 31 of the coil strip 30 through the transverse coil junction element 37 extending transversely to the elongated coil strip 30.

The base turns 35, 36 of each bifilary coil 31 of the coil row or strip 30 is held restrained at a common base level by their interlinkage with a common elongated strip-like flat backing member or backing strip 41 of flat elastic sheet metal which is relatively rigid in the plane of its surfaces. As shown in Figs. 5, 6, 7, the backing strip 41 is positioned and held between the coil junction elements 37 of the adjacent spring coil 31 of the coil strip 30 and the adjoining base turns 35, 36 of each bifilary coil 31 of the coil strip 30. Each multiple coil row or strip 30 has all its multiple bifilary spring coils 31 which are formed of a continuous wire, and interlinked at their base turns 35, 36 with a common stiff and flat backing strip so as to form an extremely simple and effective multi-coil spring structure which makes it possible to form of a plurality of elongated strip sections of such multiple coil strip 30 a highly effective spring pad supporting structure. The common backing strip member 41 of each coil strip 30 may be formed of any known elastic sheet metal material for instance of the same type of metal as used for forming the continuous wire of the coils 31.

Thus, in forming a spring pad 20 of the type shown in Figs. 1 to 4, a plurality of elongated strip sections of such multiple coil strips 30 (shown in detail in Figs. 5, 6, 7) are assembled adjacent to each other above the common sheet frame member 22 of the pad 20 with the coil backing strip 41 of each coil strip section 30 secured to the underlying border region of the frame member 22. Thus, the common backing strips 41 of each multiple coil strip 30 may be simply secured to the border edge of the underlying frame sheet member 22 by bending free end portions 42 at the two opposite ends of each backing strip 41 underneath the edge region 24 of the backing sheet member 22, this being the construction used in the commercially manufactured spring pads used with the conventional garment pressing machines. Alternatively, the two end portions 42 of each backing strip 41 of each coil strip 30 may be secured to the border of the sheet frame member 22 by electric spot welding or by screws or rivets.

In a spring supporting head of the invention shown in Figs. 1 to 4, and described above in connection with Figs. 1 to 7, the upper ends turns of the individual rows or strips 30 of the bifilary coils 31 are aligned along a substantially continuous extended backing surface formed by the upper coil turns 38 of the individual bifilary coil springs and their cross-wise filary junctions 35. It has been found good practice to place above the upper coil turns 38 of each bifilary coil of such spring pad 20 a flexible screen 43 of fine wire to provide a substantially continuous support surface overlying the upper coil turns 38 of the spring pad while permitting the individual screen surface elements overlying the individual coils to be pressed inwardly and to yield if a protruding garment portion such as a button is compressed between the upper backing surface 21 of the spring supporting pad 20 and the pressing head applied with pressure against the outer side of the pressed garment. The thin flexible metal wire screen 43 as shown in Figs. 1 to 4, is attached at spaced portions thereof to upper coil turns 38 of individual coils 31 at a limited number of positions along the extended upper surface 21 of the spring pad 20.

When used in a garment pressing machine of the like, a cover of porous fabric 45 may be readily placed over the upper screen 43 of the spring pad. The cover fabric 45 is of conventional type and it is secured along its borders to the underside of the spring pad 20 and the upper buck region 13 of the press buck 10 in a conventional way, as by lacing or a pull string not shown.

To provide for an unimpeded flow of steam from the steam passage 11 of the buck block 10 toward the upper surface 21 of the spring pad 20, the metallic backing strips 41 of the individual multiple coil strips 30 of the pad are provided with perforations or passage openings 46. In order to confine the steam flowing from the buck passage 11 to the upper surface 21 of the spring pad and its porous fabric cover 45, the peripheral borders of the spring pad 20 are enclosed by a sealing enclosure 47 of steamtight sheet material forming a border enclosure around the entire periphery of the spring pad 20. The border enclosure seal 47 may be formed of any suitable steamtight flexible sheet material, such as polyvinyl chloride sheet material, neoprene sheet material or a textile fabric coated with a layer of neoprene or polyvinyl chloride. The required junctions between the border seal sheet material 47 and the upper coil turns 38 of the array of spring coils 31 and/or their overlying cover screen 43 may be provided by a series of conventional staples 49 (Fig. 1).

Without thereby in any way limiting the scope of the invention but only in order to facilitate the ready practice thereof, there are given below constructional data of a multicoil strip formation which is used to make on a production basis an ironing spring pad of conventional size, having the shape shown in Figs. 1 and 2. The individual bifilary spring coils 31 are ½ inch in diameter and they are formed of conventional spring steel or music wire .026 to .040 inch thick. Depending on the required resiliency, the bifilary coils 31 are made with two full turns for each helix with a coil height of about 1⁷⁄₁₆ inches down to coil heights of only quarter inch formed of only one full turn for each helix. The back-up or fastening strip 41 is formed of steel strip material of the type used in making flexible metal conduits for domestic electrical wiring circuits, the metal strip having a thickness of about .025 inch and a width of ⅜ to ¼ inch. The individual multicoil strip sections are attached to the border edges of the metal sheet frame member 23 in the manner indicated in Fig. 2. At the round end regions of the metal sheet frame member 23, the individual multicoil strips 30 are attached to the frame member by electrically welding the end portions of the backing strip 41 to the upwardly facing edge portion of the frame member 22. The metal tabs (not shown) by which the metal frame member 22 is attached to the underlying border edge of the upper buck region 13 (Fig. 2) are electrically welded to the upwardly facing edge region 22 of the frame member.

Multiple coil rows or strips 20 of the invention, of the type described above such as shown in Figs. 5 to 7, are also ideally suited for forming out of them tubular or roller-type spring pressing pads for use as backing rollers over which articles to be pressed are positioned and rolled while applying over a large area of the pressed article an ironing or pressing head or implement with the requisite large pressure.

Figs. 8 and 9 show by way of example, the general arrangement of a pressing pad roller equipped with a cylindrical supporting spring pad structure 20-1 of the invention. The roller structure generally designated 51 is of conventional type and comprises a generally cylindrical drum-like frame member or roller 52 arranged to be rotatably supported by a shaft 53. Around the cylindrical surface of the drum-like roller 52 is helically wound in closely spaced convolutions a long multiple coil strip 30-1 of the type described in connection with Figs. 5 to 7 so that successive convolutions of the coil backing strip 41-1 tightly encircle the circular periphery of the roller drum 52 and hold in position a cylindrical coil spring pad 20-1 formed of a large array of bifilary spring coils 31 projecting radially outward from the common cylindrical base level represented by the base turns 35, 36 and the coil junctions 32 of the individual coils 31 overlying the cylindrical surface of the roller drum 52.

A multiple coil strip 30-1 so wound in closely spaced convolutions around the cylindrical drum roller 52 may be attached to the drum surface in any conventional way as by screws 54 which clamp the opposite ends of the backing strip 41-1 forming part of a long multiple coil spring strip structure 30-1 of the invention of the type described in connection with Figs. 5, 6, 7. If desired, the backing strip 41-1 of the multiple coil strip 30-1 may be attached to the cylindrical roller 52 at other points of the backing strip length, although attachment only at its two opposite ends has been found satisfactory for cylindrical spring support pads of standard roller-type pressing machines. A wire mesh 43-1 similar to the wire mesh 43 of the pad 20 of Figs. 1 to 4 may also be secured in position around the outer coil turn 38 of the cylindrical array of coils 31 of the cylindrical spring pad shown in Figs. 8 and 9.

Figs. 9-A, 9-B and 9-C show a multiple coil spring structure strip 30-1 of the cylindrical pad 20-1 of Figs. 8 and 9 and its construction is similar to that of the multiple coil strip 30 described above in connection with Figs. 5, 6, 7. The coil spring strip 30-1 comprises a series of helically wound bifilary coils 31, each bifilary coil 31 having two oppositely wound coil helices 33, 34. In other words, the two filary helices 33, 34 of each coil 31 has one filary helix wound forwardly and the other filary helix wound reversely thereto. The lower or inner ends of each of the two helices 33, 34 of each bifilary coil 31 is connected to the lower ends of two bifilary helices of two opposite adjacent coils by transversely extending coil junction portions 37 which pass below the common backing strip 41-1 which is interlinked with the base coil turns 35, 36 of each bifilary coil 31. The upper ends of the two filary helices 33, 34 merge and are interconnected with a straight filary cross junction element 35 which extends in cross-wise relatively to the upper coil turns of each coil 31.

The base or inner convolutions 35, 36 of each coil 31 and the transverse coil junction 32 between the individual coils 31 of a multiple coil strip 30-1 are located in substantially the same base plane or the base level from which each spring coil 31 extends in outward direction. The upper end convolutions 38 of each coil 31 and their filary cross-wise junction elements 35 are located in the same outer plane to provide an extended even support surface 21-1 at the top of the spring pad formation 20-1. As indicated in Fig. 9-B, the straight filary junction portion 35 of each coil spring 31 is shown shorter in length than the diameter of the helical coil spring 31 and the top convolution 38 of each coil 31 is spiralled inwardly from opposite directions to provide a generally S-shaped contour at the top of each coil spring 31. The width of the backing strip 41-1 is about equal to the inner diameter of the lower or base convolutions 35, 36 of the individual spring coils 31.

Figs. 10, 11 and 12 show another buck type spring pad generally designated 20-2 made in accordance with the principles of the invention and arranged so that the outer surface of the spring pad structure is either flat or curved. The spring pad 20-2 comprises a relatively stiff backing or frame member 22-2 having an extended backing surface held arrayed in close side-by-side relation a plurality of adjacent multiple coil spring strips 30-1 of the type described and shown in connection with Figs. 9-A, 9-B, 9-C or 5, 6, 7. Each multiple coil strip 30-1 is held with its base coil turns 35, 36 attached against the outer surfaces 23-2 of the backing member 22 by attaching the ends of each backing strip 41-1 to the opposite edge regions 24-2 of the backing sheet member 22-2. In the form shown, the free end of each backing strip 41-1 of each multiple coil strip is folded over the underside of the backing member edge 24-2 and attached thereto as by electric spot welding connection indicated at 43-2.

The pad 20-2 of Figs. 10, 11 has also a thin smooth highly flexible cover sheet member 44-2 of metal, for instance, retained on the top of the outer convolutions 38 of the array of bifilary coils 31 extending outwardly from the extended backing surface of the backing member 22-2. The thin cover sheet member 44-2 is shown provided with a series of longitudinal slits 45-2 to increase the flexibility of the cover sheet 44-2. The individual slits 45–2 of the thin cover sheet formation 44–2 which may be of metal, are shown staggered to provide uniformly distributed yieldability over the entire extended area of the cover sheet 44–2 overlying the array of coil springs 31 of the spring pad structure 20–2. The thin flexible cover sheet 44–2 is suitably connected to the underlying top convolutions of the array of coil springs 31 of the pad 20–2 as by bending end portions 46–2 of the cover sheet 44–2 over the outer coil turn 38 of end rows of bifilary coils extending along the opposite edges of the pad 20. (Fig. 10, 11).

Bifilary coil arrays of the invention of the type described above, may be manufactured on a continuous basis from a continuous wire and a continuous backing strip in any desired length. The multiple coil strips of the invention so manufactured are flexible in the direction perpendicular to the plane of the common backing strip interlinked with the base turns of the coil and they may be attached to the backing surface of either a flat or curve backing support or to a drum or cylindrical backing support. Depending on the pressure to which the outer surface of the spring pad of the invention is subjected, the multiple coil spring structure thereof may be manufactured on an economical basis to provide for any required stiffness of the individual bifilary coils of the multiple coil strips of such spring pad.

In the spring pad structure of the invention of the type described above, a large array of bifilary coils all extending in outward direction from a common base level are formed of adjacently held rows of multiple bifilary coils. The large number of bifilary coils of each row of coils is formed out of a single wire so that all coils extend outwardly from the base coil turns of each coil which are aligned along an extended coil surface so that the outer coil turns provide an extended support surface for an article pressed or the like. By forming the spring pad of array of rows of bifilary coil strips, the flexing stresses are properly distributed over a great length of coil spring wire, thereby practically eliminating spring breakage due to fatigue failure. By using bifilary coils forming part of continuous wire of each multiple coil strip, the cross-sectional area of the filary wire helices of each bifilary coil may be reduced to one-half while providing the same spring stiffness and resistance to deflection as a single helix coil used in the best prior spring-type pressing pads. By combining a low row of coils into a single multiple coil unit formed out of a single wire, the problem of retaining the spring coils in their aligned operative positions is greatly simplified as a single relatively thin sheet metal backing strip interlinked with the base turns of the individual bifilary coils of each multiple coil strip provides the required mounting connection between the individual coils and the backing support.

Multiple coil strips of the invention described above in connection with Figs. 5, 6, 7 and 9–A, 9–B, 9–C may be formed of a continuous wire in any suitable manner as by use of a mandrel. By way of example, the series of a large number of spring coils 31 of a multiple coil strip 30 may be formed from successive sections of a continuous wire by winding one filary coil helix first in one direction and then another filary coil helix of the same coil in an opposite direction with the convolution of second filary coil helix interleaved between the convolutions of the first filary coil helix. The next bifilary coil 31 is then formed of the same wire in like manner adjacent the first bifilary helical coil 31, the first filary helix of the next bifilary coil being wound in the opposite direction to the second filary helix of the preceding bifilary coil, i. e., each bifilary coil being thus wound with two helices coiled in opposite directions and parallel to each other. When forming a series of adjacent bifilary coils out of a continuous length of wire so that each coil extends outwardly in the same direction from a common base level of all coils, in accordance with the invention, the diameter and the number of convolutions of each coil and the cross-section of the coil wire may be varied depending on the required resiliency of the pad. It should be noted that a variation in the diameter of a bifilary coil of such coil pad structure of the invention may affect the resiliency or stiffness of the individual bifilary coil springs of the pad to a greater extent than the height of the individual bifilary coils 31.

The backing strip 41 which is interlinked with the base convolutions 35, 36 of the individual bifilary coils 31 of each coil strip 30 and their coil junctions 37 may be combined in a variety of ways with the preformed multiple coil wire structure formed out of a continuous wire. Thus, with the individual wire coils 31 extending outwardly from the crossing coil base junctions 37 between the coils, an array of such coils may be wound around the backing strip 41 by winding successive transverse coil base junction 37 over one side of the backing strip 41 with the adjoining base convolutions 35, 36 of each coil wound on the opposite side of the backing strip so that each helical bifilary coil extends outwardly in the same direction from the backing strip and with the base convolutions 35, 36 of each coil engaging the backing strip 41.

A set of series of outwardly extending bifilary coils 31 is thus wound with their coil junction 37 around the backing strip 41 so that the backing strip 41 and base convolutions 35, 36 of each coil are interlaced or interlinked and retained between the transverse coil junctions 37 and the base convolutions 35, 36 of each outwardly extending coil.

When a very flexible backing strip 41 is used for the multiple coil pad structure 20, 20–1, 20–2, the flexible backing strip 41 may be wound directly into position between the coil cross junctions 37 which connect adjacent coils and the adjoining base convolutions 35, 36 of each bifilary coil 31.

By way of another example, the backing strip may be threaded into position between the base convolutions 35, 36 of successive coils of a multiple coil wire formation of the type shown in Figs. 6, 7, 8 and the coil junction elements 37 between adjacent coils, by feeding a pointed end of a flat backing strip 41 progressively between successive coil cross junction elements 37 of adjacent coils and the overlying base coil convolutions 35, 36 of adjacent coils, the threading being progressively carried on with the backing strip being fed in one direction and the multiple coil wire formation being fed in opposite direction so that successive coil cross junction elements 37 come into engagement with one side of the forward end of the backing strip 41 and the base convolutions 35, 36 of each coil come into engagement with the opposite side of the forward end of the backing strip 41.

It should be noted that in the multiple coil strip formation of the invention of the type described in connection with Figs. 5, 6, 7 and 9–A, 9–B, 9–C, the backing strip 41 is positioned between the base convolution of one filary helix of one of the spring coils 31 and the coil junction portion 37 connecting this filary helix of said one coil with the oppositely wound filary helix of the next adjacent coil of the multiple coil wire formation so that the two filary base convolutions 35, 36 of each coil 31 tend to grasp the opposite edges of the backing strip 41 between them. Good results are obtained by arranging the adjacent coils 31 of a multiple coil strip formation so that just enough clearance is provided between adjacent bifilary coils 31 as to permit compression of the bifilary coil helices without causing interference or interlocking between the convolutions of adjacent bifilary coil springs 31.

Fig. 13 shows in conjunction with detail Figs. 14 to 20, partially diagrammatically and partially in phantom, one form of a production equipment generally designated 50 which was found satisfactory for producing continuous wire bifilary coil formations of the multiple coil type of the invention and interlinking a strip-like backing member with the base turn of the individual bifilary coils out of a combined multiple coil strip formation such as shown in Figs. 5, 6, 7 and Figs. 9–A, 9–B, 9–C. The production equipment 50 comprises a supply of wire 51 stored in coiled form on a supply reel 2–11 from which the wire is controllably fed to a coil-forming equipment generally designated 2–20 which forms a long wire 51 into a continuous wire coil formation 52 of adjacent bifilary coils 31 extending outwardly from a pair of base turns 35, 36 of each coil (Figs. 5, 6, 7) which base turns 35, 36 are connected to the adjacent coil base turns 35, 36 through cross-wise extending coil junction 37 formed of the same wire 51.

From the coil-forming equipment station 2–20 the continuous array 52 of wire coils is led in a controlled manner over a suitable guide way, such as over a series of guide rollers 53, to interlacing equipment generally designated 3–10, which interlaces the metallic backing strip 41 with the coil junction 37 and base convolutions 35, 36 of successive bifilary coils of the continuous wire coil formation 52.

The interlacing or interlinking equipment 3–10 comprises a supply of the backing strip 41 indicated by a strip supply reel 3–11 which holds a large coiled supply of the backing strip 41. From this supply reel 3–11 the backing strip 41 is led by way of a guide structure 3–12 to an interlacing station 3–20 towards which the multiple coil wire formation 52 is fed from guide roller 53 by way of a guide structure 2–31 in a direction generally transverse to the direction of the motion of the backing strip 41 past the interlacing station 3–20. From the interlacing station 3–20 the backing strip 41 with the individual coils of the multiple coil wire formation 52 interlaced therewith are fed in the form of a finished multiple coil strip assembly 30 by way of a guide structure 3–70 to storing means shown in the form of a storing reel 3–81. The backing tape supply reel 3–11 and the multiple coil strip storing reel 3–81 are shown, for the sake of simplicity, in the form of small reels, their size being proportioned in accordance with the particular production requirements.

The coil forming equipment 2–20 (Figs. 14–20) comprises a cylindrical coil forming mandrel 2–21 provided at its forward end with a grooved mandrel portion 2–22 of reduced diameter from which extend endwise a pair of projecting grip teeth or grip elements 2–23. The cylindrical mandrel 2–21 is provided with a rearwardly extending cylindrical mandrel support 2–25 which is mounted for revolving and longitudinal outward motion along an axis within a bearing structure 2–31 forming a stationary part of the equipment. The bearing structure 2–25 with the cooperating surface of the cylindrical mandrel support 2–25 are so arranged that when a rotary motion is imparted to the mandrel support 2–25 in one direction, interlocking elements between a tooth of the bearing structure 2–31 and a helical groove 2–26 formed in the mandrel support 2–25 cause the mandrel support to be advanced in axially outward direction (to the right as seen in Figs. 14 through 17) while the mandrel is being rotated in counter-clockwise direction (as seen in Fig. 16) for a number of revolutions corresponding to the number of helical bifilary coil turns of a bifilary coil 31 which are to be formed in each of a succession of longitudinal wire sections of the wire 51 advanced in front of the mandrel grip teeth 2–23.

The wire 51 is fed by a suitable controlled feed mechanism 2–13 including coil guide rails 2–15 so that when the mandrel 2–21 is held by the bearing 2–31 in retracted starting position, in which it is shown in Fig. 16, the wire 51 fed from the reel 2–11 will pass between or opposite the two grip teeth 2–23 at the forward end of the mandrel 2–21 in alignment with the forward direction of the motion of the wire formation 52 towards the guide roller 53.

The production equipment is so designed that after completing the formation of each bifilary coil 31 on a longitudinal section of the wire 51, the mandrel 2–21 is rotated in clockwise direction, as seen in Fig. 15 so as to be withdrawn from the formed coil 31, and permit the last-formed coil 31 together with the formation 52 of the previously formed coils 31 formed on the preceding length of the wire extending to the left of the mandrel 2–21 (as seen in Fig. 14), to be moved to the left of the mandrel 2–21 by a length of a complete wire section required to form the next bifilary coil that is to be formed out of the so advanced wire section by counterclockwise rotation of the mandrel 2–21 accompanied by axially outward movement thereof.

The production equipment is also so designed with automatic means operative after completing the formation of each bifilary coil 31 on a longitudinal wire section of the wire 51, to cause the wire formation 52 with the coils 31 formed thereon including the last-formed coil to be moved to the left of the mandrel, as seen in Fig. 14, by a length of one-half of a complete wire section coil length required to form of the wire 55 the next complete bifilary coil 31. Fig. 14 shows the coil forming mandrel 2–21 in a position in which it engages the center portion of a wire section coil length 51 with one-half of the coil length of the wire extending to the left of the mandrel center, the mandrel 2–21 being shown in the initial stage of the process of forming the next bifilary coil after an initial mandrel movement of 180° from its initial starting position shown in Fg. 16.

The equipment is also provided with suitable means for automatically imparting to the mandrel 2–21 a limited amount of rotary motion in counterclockwise direction, as seen in Fig. 14, each time after the wire formation 51 has been advanced past the end of the mandrel to the center of the next coil wire section length corresponding to one-half of the wire length of the next coil to be formed of the wire 51. In the equipment shown, there is indicated that the rotary motion is imparted to the mandrel 2–21 by rotating, as with oscillatory gears 2–26, a mandrel sleeve 2–27 under the control of an automatic timing or drive control mechanism 2–28 to cause the mandrel to be rotated a predetermined number of times after each advancement of the wire 51 with the coil formations 52 formed thereon by half a wire length required for forming the next coil. The drive control mechanism 2–28 includes means for imparting to the mandrel a similar opposite rotation for causing the mandrel 2–21 to be withdrawn by a combined axial and clockwise motion from the just-formed coil 31 so as to free it from its engagement with the mandrel 2–21. The wire feed mechanism 2–13 is also provided with automatic means set into operation after completing the formation of each bifilary coil 31 and withdrawal of the mandrel 2–21 to its retracted position, for causing the wire 51 to be advanced past the retracted mandrel 2–21 by one-half of a wire section length required for forming the next coil.

The means for effecting the automatic controls described above, may be of a conventional type, and consist, for instance, of electrical motor elements the energization and de-energization of which is automatically timed by electric switches of a timing drum and trip switches which are actuated by the mandrel support 2–25 when it reaches its outward position (Fig. 15) and its retracted position (Fig. 16). Each time the automatic control mechanism 2–28 is actuated to start the next coil forming operation (on a coil wire section length advanced with its center or mid-point against the retracted forward end of the mandrel 2–21 (Fig. 16)), the mandrel 2–21 is actuated to perform a sequence of coil-forming operations described below.

Just before starting the coil-forming operation, the mid-portion of the next coil wire section which is to be formed into a bifilary coil, lies opposite the forward end of the retracted mandrel 2–21, with the center portion of the wire section 51 lying between the two grip teeth 2–23 at the front end of the mandrel 2–21, as seen in Fig. 16.

On starting the coil-forming operation, a combined axial forward movement as well as a counterclockwise movement (as seen in Figs. 14 to 20) is imparted to the coil-forming mandrel 2–25. During the initial half rotation of the mandrel 2–21 from the starting position shown in Fig. 16, the center portion 39 of the wire length section 51 is gripped by the mandrel teeth 2–23 and turned by them, thereby causing the adjoining portions of the wire 51 to be wound into the initial opposite groove sections 2–22 of the forward end of the mandrel, this mandrel position being indicated in Figs. 14 and 19, to which it is brought from the position shown in Fig. 16, after first passing the position in which it is shown in Fig. 18.

The continuing coil-forming operation causes further combined axial forward and counterclockwise movement of the mandrel 2–21, thereby causing further portions of the wire length extending to the right and left of the mandrel as seen in Fig. 19 to be wound as successive opposite coiled helices around successive longitudinal sections of the mandrel in the manner indicated in Fig. 15 until the desired entire length of the new bifilary coil is formed, so that it is positioned and extends axially substantially parallel to the immediately preceding bifilary coil 31 formed out of the wire in a preceding full operation or cycle of the mandrel 2–21.

As indicated in Figs. 14 and 15, the equipment associated with the coil-forming mandrel mechanism 2–20 is provided with guide elements shown in the form of a pair of guide pins 2–31, 2–32 to the right of the mandrel 2–21, and guide pin 2–34 to the left of the mandrel, as seen in Figs. 14 to 20, for assuring that the portions of the wire 51 approaching the mandrel 2–21 from the opposite sides during the coil-forming operation are maintained at the proper level relative to the mandrel, other conventional wire guide elements (not shown) serving to guide the wire 51 in its properly aligned axial position during its motion toward and away from the mandrel 2–21. The wire guide element 2–34 with its forward small hook end is so arranged as to permit each new bifilary coil completed by an operating cycle of the mandrel 2–21 to be moved past the guide element 2–34 without interference therewith.

As soon as the combined axial forward and counterclockwise movement of the mandrel has completed the part of the operating cycle required for forming the complete bifilary coil of desired length, the motion of the mandrel is automatically reversed for performing the end part of its operating cycle. In the end part of its operating cycle, the coil-forming mandrel 2–21 is given a combined rearward axial and counterclockwise movement, thereby causing the mandrel to be withdrawn from the position shown in Fig. 15 to its retracted position wherein it is released from the just formed bifilary coil 31, whereupon the mandrel is stopped in its retracted position. On being stopped in its retracted position (Fig. 16), the retracted mandrel 2–21 brings about actuation of the wire feed mechanism 2–13 for causing the next wire section of the reel wire 51 to be moved with its center portion opposite the forward end of the retracted mandrel (Fig. 16) while the array of multiple coil wire formations 52 is advanced to the left of the mandrel, as seen in Figs. 13 to 15.

These sequential operating cycles of the mandrel and wire feed mechanism are repeated for successive wire length sections of the continuous wire 51, for automatically forming them into a succession of interconnected bifilary coils 31 continuously advanced along the guideways indicated by guide rollers 53 towards the interlacing equipment 50. The so-formed multi-coil wire formation 53 is so guided over the guide rollers 53 as to provide therein a certain slack, which may be taken up by festoon rollers, not shown, to permit the wire formations in the vicinity of the mandrel 2–21 to be moved back and forth in an oscillatory movement corresponding to oscillatory movement of the mandrel 2–21 in forming successive bifilary coils on adjacent wire sections of the continuous wire 51.

The interlacing equipment 50 (Fig. 13) is so designed in accordance with the invention as to cause the multi-coil wire formation 52 to be advanced towards the backing tape 41 in a direction transverse to the direction of the movement of the backing strip 31 from its supply reel 3–11, shown to the left of Fig. 13, towards its storing side shown to the right of Fig. 13 as the storing reel 3–81. As the successively advanced bifilary coils 31 of the coil wire formation 52 reach successive portions of the backing strip 41, the approached length of the backing tape 41 is rotated relatively to the advanced coil formation 52 around an axis substantially aligned with the direction of the coil advancing movement toward the tape. These combined motions of the coil formation 51 and the tape 41 are so arranged as to cause successive coil junction wire elements 37 between adjacent coils 31 of the continuous coil wire formation 52 to be wound around one side of the backing strip 41 while the base turns 35, 36 of each bifilary coil 31 come into engagement with the opposite side of the advanced backing tape 41, thereby producing the multi-coil strip 30 on successive portions of the backing tape on which preceding bifilary coils of the wire formation 52 have been thus wound, which multi-coil strip 30 is being moved along the direction of the advancing movement of the backing tape 41 to the left of the interlacing station 3–20 as seen in Fig. 13.

Fig. 13 indicates in a diagrammatic manner the principles of a practical mechanism for performing the interlacing operations described above. In the form shown, the interlacing equipment 50 comprises a fixed mounting frame structure generally designated 3–40 (a portion only of which is shown) provided with a fixed vertical hollow guide post 3–41 the interior of which is designed to have a guide passage for guiding consecutive sections of the multi-coil formation 52 which is being fed from the coil-forming equipment 2–20 to the interlacing equipment 50. The guide post 3–41 is shown operating as a rotary axis support of a rotary frame structure 3–42 arranged to rotate around the axis of the guide post 3–41 which is shown as of cylindrical shape. In suitable bearings of the rotary frame structure 3–42 are rotatably mounted in coaxial alignment the two longitudinal guide ways 3–12, 3–70 which guide the backing tape 41 from the tape supply means 3–11 to the coil strip storing means 3–81 on which the multi-coil strip formation 30 is stored.

Means are also provided for causing the rotary frame structure 3–42 to rotate around the longitudinal axis of the guide post 3–31 along which the multi-coil wire formation 52 is advanced to the interlacing station 3–20, and for causing the two guide ways 3–12, 3–70 of the backing tape 41 and the completed continuity of multi-coil strip formation 30 to be rotated in their mounting bearings as a coaxial unit around the axis defined, in general, by the direction of movement of the backing tape 41 and the completed multi-coil formation strip 30 past the interlacing station 3–20.

In Fig. 13, the required rotary motion is shown imparted to the rotary parts of the interlacing mechanism by a drive mechanism comprising an electric motor 3–51 having a shaft and gear which rotates a gear 3–52 that is affixed to the rotary frame member 3–42 for causing it to rotate around the guide post 3–41. The rotary motion of the rotary frame member 3–42 is in turn utilized for imparting the required unitary rotary motion to the two coaxial longitudinal guide members 3–12, 3–70 within the rotary frame member 3–42 for rotating them around an axis transverse to the axis of rotation of the rotary frame member 3–42. The required rotary motion is shown imparted to the rotary guide member 3–70 by a bevel gear 3–71 affixed thereto and meshing with a bevel gear 3–72 forming a fixed part of the stationary guide post 3–41. A suitable mechanical synchronizing linkage, indicated by two sets of gears 3–73 and an interconnecting shaft 3–74, causes the rotary guide member 3–12 to rotate in unison with the rotary guide member 3–70 while they are both maintained in coaxial alignment and rotated by the rotary frame structure 3–42.

The tape supply means, to wit, tape reel 3–11, is rotatably supported as by two supporting bracket members 3–77 of rotary guide member 3–12 so as to be carried thereby and rotate therewith at the same speed as the coaxial guide member 3–70 while permitting withdrawal of the continuous backing tape 41 reeled thereon by way of the hollow guide channel of the guide member 3–12 toward the interlacing station 3–20. The supply reel 3–11 is provided with motion resisting means which resist in a limited way the withdrawal of the backing tape 41 therefrom. In the form shown, the motion resisting means comprises a brake pad 3–78 carried by the reel bracket structure 3–77 and arranged to brake the movement of the reel 3–11 when the backing tape 41 stored thereon is withdrawn therefrom and pulled through the guide member 3–12 toward the interlacing station 3–20.

The coil storing means is likewise shown in the form of a storing reel 3–81 arranged to store the completed multiple coil strip 30 as it is being formed at the interlacing station 3–20 and withdrawn to the right as seen in Fig. 3 through the guide channel member 3–70 toward the coil strip storing reel 3–81. The coil strip storing reel 3–81 is shown rotatably carried by two supporting bracket members 3–82 of the rotary guide member 3–70 so as to be carried thereby and to cause the storing reel 3–81 to rotate with the guide member 3–70 while the storing reel 3–81 is rotated around its center between brackets 3–82 for reeling thereon successive convolutions of the finished multi coil strip 30.

Suitable means are also provided for imparting a rotary advancing motion to the coil strip storing reel 3–81 and causing it to reel thereon successive convolutions of the finished multi coil strip 30 while withdrawing it through the rotary guide channel member 3–70 from the interlacing station 3–20. This may be done by any mechanism which utilizes the rotation of the rotary guide channel member 3–70 for imparting a rotary advancing step to the storing reel 3–81 as successive coils of the multi coil formation 52 are interlaced at the interlacing station 3–20 with their coil junctions 37 around the backing strip 41 in the manner described above.

In Fig. 13, the required drive for imparting a rotary advancing movement to the storing reel 3–81 is shown provided by a ratchet wheel 3–83 coaxial with and positively coupled to the storing reel 3–81 and arranged to be advanced by the forward tooth of a push rod 3–84, guided for longitudinal movement as by brackets 3–85, of the rotary guide member 3–70, when the push rod is moved to the right as seen in Fig. 13. The push rod 3–84 is arranged to be normally restrained to a retracted position, as by a biasing spring 3–86, and to operate so that when it is pushed longitudinally, to the right as seen in Fig. 13, its forward end tooth comes into engagement with a peripheral ratchet tooth of the ratchet wheel 3–83 and impart thereto a rotary advancing step of a length corresponding to the length of the longitudinal forward motion imparted to the push rod 3–84.

The push rod 3–84 is in turn arranged to be selectively actuated in the forward pushing direction for advancing the ratchet wheel 3–83 by a distance determined by the progress of the interlacing operation carried on at the interlacing station 3–20 in which successive coils 31 of the coil formation 52 are interlaced with the backing strip 41 and have to be withdrawn from the interlacing station after each interlacing operation.

Any mechanism which transforms the rotary motion of the guide channel member 3–70 operates selectively in a response to successive interlacing operations for imparting to the push rod 3–84 a ratchet advancing movement required for withdrawing successive interlaced coil strip portions from the interlacing station 3–20 may be utilized.

In Fig. 13 the push rod 3–84 is selectively advanced by the engagement of its rearward follower end with a cam projection 3–87 extending from a cam member 3–88 pivotally mounted on pivot brackets 3–89 extending from and held affixed to the rotary frame member 3–42 of the interlacing mechanism.

In the practical equipment of the invention, the cam member 3–88 is shown in the form of a horseshoe-like structure, the circular cam portion of which is coaxial with the rotary guide channel member 3–70 and provided with a tooth-like cam projection 3–87 shaped to engage the rearward follower end of the push rod 3–84 for a shorter or longer period during each rotation of the circular cam depending on the extent to which the circular cam portion of the cam member 3–88 is tilted around its pivot brackets 3–89.

The position of the circular cam member 3–88 and its cam projection 3–87 is controlled by a feeler or follower shown in the form of a coil follower arm 3–91 carried at the lower end of a pivot shaft 3–92 and arranged so that the follower arm 3–91 is urged into contact engagement with successive coils 31 of the coil formation 52 reaching the interlacing station 3–20 as the coil formation 52 is advanced from the guide channel member 3–41. The follower arm 3–91 is so constructed and shaped as to yield and permit successive coils 31 of the coil formation 52 to be moved past it toward adjacent portion of the backing strip 41 that is positioned at the interlacing station 3–20 for winding thereon and interlacing the coil junctions 37 of successive coil 31 of the coil formation 52—while at all times following and maintaining contact with the successive coils 31 and portions of the coil formation 52 which are reaching the interlacing station 3–20. In practice, it has been found that a generally cylindrical resilient arm member 3–91 will operate properly as such coil follower arm. A helical coil spring of substantial stiffness having a coil diameter of about ½ inch is used as the coil follower arm 3–91 in the practical equipment of the invention.

The pivot shaft 3–92 of the coil follower arm 3–91 is pivotally mounted adjacent the rotary frame 3–42 as in a suitable bearing 3–93 thereof, and carries on its upper end an actuating arm which is linked by a rod 3–94 to the upper end of the cam member 3–88 for transmitting the turning motion of the coil follow arm 3–91 to the cam member 3–88 and thereby determine the position of its cam tooth 3–87 by the position of the coil follow arm 3–91. The link rod 3–94 has pivotal connections with the upper actuating arm of the follower pivot shaft 3–93 and with the upper end of the cam member 3–88, suitable biasing means, such as a biasing spring 3–95 connected to the rearward pivot end of the push rod 3–94 tending, being arranged to exert a biasing action which tends to return the circular cam portion of the cam member 3–88 with its cam tooth 3–87 to the retracted position, to the left as seen in Fig. 13, in which the cam tooth 3–87 does not engage the rearward follower end of the push rod 3–84 during rotation thereof with the guide channel member 3–70 around the axis thereof.

The coil follower arm 3–91 and the associated mechanism cooperates with the push rod 3–84 and the associated advancing ratchet 3–83 of the storing reel 3–81 for selectively advancing and cause it to withdraw successively formed coil sections of the coil strip formation 30 from the interlacing station 3–20 in the manner described below.

In each full rotation of the coaxial guide channel members 3–70 and 3–12 around their axis, while the frame member 3–42 performs a full rotation around the axis, the guide channel member 3–41, another coil 31 of the coil formation 52 reaching the interlacing station 3–20 is wound with its coil junction 37 around the backing strip portion 41 positioned at the interlacing station 3–20, and the next coil 31 of the coil formation 52 is similarly wound with the next coil junction 37 of the coil formation 52 around the next succeeding portion of the backing strip 41 along the left region of the interlacing station 3–20 as seen in Fig. 13. Such successive interlacing of successive coils 31 of the coil formation 52 with successive portions of the backing strip 41 positioned at the interlacing station 3–20 causes the coil follower arm 3–91 to be turned to the left as seen in Fig. 13. This leftward movement of the coil follow arm 3–91 is transmitted by its pivot shaft 3–92 and its upper arm link 3–94 to the upper end of the cam member 3–88 causing the latter to move to the left as seen in Fig. 13. The leftward movement so imparted to the upper part of the cam member 3–88 causes its cam tooth 3–87 to be moved to the right as seen in Fig. 13, so that in the course of the rotation thereof of the circular portion of the cam member 3–88, a portion of its cam tooth 3–87 engages the follower end of the push rod 3–84 and pushes the latter into engagement with a ratchet tooth of the ratchet wheel 3–83 by a longer or shorter advancing step corresponding to the amount of the leftward tilt imparted to the coil follower arm 3–91 by successive coils 31 wound around the backing member 41.

In other words, the leftward movement of the coil follower arm 3–91, imparted thereto by successive coils 31 of the coil formation wound around the backing member portion 41 positioned at the interlacing station 3–20, is transmitted to the cam member 3–88 and causes its cam tooth 3–87 to impart a corresponding push movement to the push rod 3–84 during the rotation thereof around the axis of guide channel member 3–70 so as to impart to the ratchet wheel 3–83 an advancing movement which advances the storing reel 3–81 and causes it to wind thereon and to withdraw the interlaced coil sections from the interlacing station 3–20. The advancing movement so imparted to the coil strip formation 30 formed at the interlacing station withdraws a corresponding length of the backing strip 41 from its supply reel 3–11 and brings it to the interlacing station 3–20 for the next coil interlacing sequence. The braking action exerted by brake 3–78 on the supply reel maintains the backing strip under limited tension required for carrying on the interlacing operation.

As an alternative, the required advancing motion may be imparted to the storing reel 3–81 by a modified mechanism of the type indicated diagrammatically in Fig. 13–A. It comprises a set of meshing gears including a gear 4–11 affixed to the rotary guide channel member 3–70, a gear 4–12 meshing therewith and mounted for rotation around a shaft axis extending from rotary frame member 3–42 and also meshing with gear 4–13 which drives through a worm gear 4–14, a gear 4–15, which is coupled as through a friction coupling, the storing reel 3–81 for rotating the same and causing it to wind thereon successive portions of the coil strip formation 30 as they are withdrawn thereby from the interlacing station 3–20. Such storing reel drive may be readily designed so as to drive or advance the reel 3–81 with a speed equal to the maximum speed required for reeling thereon finished convolutions 52 of the multicoil strip 30 of a minimum diameter, and to permit the reel 3–81 to be rotated or advanced at a decreased speed as the diameter of the convolutions of the finished multicoil type 30 reeled on the storing reel 3–81 increases.

In the equipment shown in Fig. 13, the rotary frame member 3–42 is being rotated around a vertical axis in clockwise direction and the two coaxial guide members 3–12, 3–70 are rotated around their axis in clockwise direction as seen from the right side toward the left of Fig. 13.

The production equipment indicated in Fig. 13 and described above in connection with Figs. 13 to 20 operates on a continuous basis to form out of great lengths of wire 51 and backing strip 41 a long multicoil strip formation 30 in the manner described below. Successive wire length sections of wire 51 are moved from reel 2–11 in successive advancing steps opposite the forward end of the coil forming mandrel 2–21 so that the previously just finished bifilary coil 31 is spaced from the end of the just retracted coil forming mandrel 2–21 by one-half of the length of a complete wire section required to form a complete bifilary coil. As soon as the next wire section of the wire 51 has been so advanced with its center opposite the coil forming mandrel 2–21, the latter is automatically actuated to form out of it a bifilary coil and after completing the coil forming process the mandrel 2–21 is automatically withdrawn from the just formed bifilary coil whereupon the next wire section of the wire 51 is moved opposite to the forward end of the retracted mandrel 2–21 for starting the next coil forming operations. This coil forming process is automatically performed in a succession of steps on successive sections of the wire 51 moved from the reel 2–11 toward the forward end of the coil forming mandrel 2–21, while consecutive sections of the previously completed multicoil wire formation 52 are automatically withdrawn as a continuity from the region of the mandrel 2–21 and transported towards the interlacing equipment 3–10.

In the interlacing equipment 3–10, successive coil sections of the continuous multicoil formation 52 are advanced towards a portion of the backing strip 41 which is arranged to be automatically advanced in a step by step or relatively continuous movement from storing means shown as supply reel 3–11 to the interlacing station 3–20 and therefrom, together with the coils 31 of the coil formation 52 interlaced therewith, to a storing structure shown as the storing reel 3–81 which is arranged to be advanced step by step or on a relatively continuous rotary movement for storing thereon in the form of concentric convolutions successive coil sections of the interlaced multicoil strip formation 30 withdrawn from the interlacing station 3–20. As the multicoil wire formation 52 is advanced toward the interlacing station 3–20 of the interlacing equipment, the backing strip 41 is rotated relatively to the path along which the coil formation 52 brought towards it while at the same time the backing strip is rotated around the axis along which it is advanced transversely to the coil formation 52. These combined translatory and rotary movements of the coil formation 52 and of the coil strip formation 30 along transverse translating directions are carried on in such manner as to cause the junction portion 37 between consecutive coils 31 of the coil formation 52 to be wound around one side of successive sections of the backing strip 41 with the base turns 35, 36 of each coil 31 overlying and gripping the opposite side of the backing strip 41 as it is advanced step by step or in a continuous motion towards the interlacing station 3–20 so as to successively interlace, on a continuous production basis, the junction portions 37 of each successive coil 31 of the multicoil formation 52 with successive portions of the backing strip 41 and form out of them a combined continuous coil strip formation 30.

The successive sections of the backing strip 41 which are so interlaced with the successive coil junction portions 37 of the continuous multiwire formation 52 into a continuous coil strip 30 are automatically withdrawn in a step by step or continuous movement from the interlacing station 3–20 towards a storing station shown in the form of the storing reel 3–81 on which the completed multicoil strip formation 30 is being stored in the form of successive convolutions as the process of forming a continuous multicoil strip formation 30 is continued. After a desired length of the coil strip formation 30 has been thus formed, it is removed from the storing reel 3–81. Alternatively, the storing reel 3–81 on which the desired great length of the coil strip formation 30 has been wound is removed from its position on the equipment shown in Fig. 13 after first cutting the multicoil strip formation 30 near the position where it enters the storing reel 3–81. Another empty storing reel 3–81 is thereupon mounted in the operative position on the equipment of Fig. 13, and the part of the multicoil formation 30 protruding from the exit end of the guide channel 3–70 is attached to the inner level of the storing reel 3–81. Thereupon, the equipment of Fig. 13 is re-started for forming by a similar procedure a similar long continuous multicoil strip formation 30, successive convolutions of which are stored on the storing reel 3–81. In this manner, the desired long length of multicoil strip formations 30 may be automatically produced on a continuous basis.

The features and principles underlying the invention described above in connection with specific exemplifications, will suggest to those skilled in the art many other modifications thereof. It is accordingly desired that the appended claims be construed broadly and that they shall not be limited to the specific details shown and described in connection with exemplifications thereof.

I claim:

1. In the method of producing a long coil strip of a spring support structure, the procedure comprising forming at a forming station out of adjacent longitudinal sections of a continuous long wire of spring metal a large number of adjacent bifilary helically wound spring coils projecting as a coil row of adjacent generally parallel coils from a common base level, with each successive coil of said coil row having at said base level a pair of base turns with turn end portions directed in generally opposite directions and with one turn end portion of each coil being connected to the oppositely directed turn end portion of the adjacent coil through a transverse coil junction extending generally transversely to said coil row, feeding successive coils of said coil row to an interlacing station, also feeding an elongated flexible metallic backing strip which is relatively rigid in the direction of its extended strip surface to said interlacing station along a path which is displaced from the path of said coil row, and interlacing at said interlacing station successive coils of said coil row around successive strip sections of said flexible backing strip by winding coil junctions of successive coils of said coil row around one extended side of said strip section so that the base turns and all other turns of each coil overlie the opposite side of the associated strip section and thereby form with said backing strip a coil strip having the coils of all coil strip sections held restrained by said backing strip against displacement from aligned positions in said row, said interlacing operation including rotating backing strip sections brought to said interlacing station around a strip axis generally coaxial with said strip path as a coil junction of each successive coil is wound at said interlacing station around each successive backing strip section, and rotating coil sections brought to said interlacing station around a coil path axis generally coaxial with said coil path as a coil junction of each successive coil section is wound at said interlacing station around an associated backing strip section.

2. In the procedure for producing a long coil strip formation as claimed in claim 1, the coil sections brought to said interlacing station being rotated at a rate and in a direction corresponding to the rotation of said backing strip sections brought to said interlacing station.

3. In the procedure for producing a long coil strip formation as claimed in claim 2, said procedure also including withdrawing from said interlacing station successive coil strip sections formed at said interlacing station along a withdrawal path as successive coils of said coil row are interlaced with said backing strip at said interlacing station, and rotating the withdrawn coil strip sections around a withdrawal axis generally parallel to said withdrawal path.

4. In the procedure for producing a long coil strip formation as claimed in claim 3, the coil strip sections being rotated at a rate and in the direction corresponding to the rotation of said backing strip sections brought to said interlacing station.

5. In the procedure for producing a long coil strip formation as claimed in claim 4, each interlacing sequence in which the coil junction of a coil section brought to the interlacing station is wound around an associated backing strip section being accompanied by one revolution of a backing strip section around said strip axis and one revolution of a coil section around said coil path axis.

6. In the procedure for producing a long coil strip formation as claimed in claim 5, each interlacing sequence in which the coil junction of a coil section brought to the interlacing station is wound around an associated backing strip section being accompanied by one revolution of the withdrawn coil strip section around said withdrawal axis.

7. In the procedure for producing a long coil strip formation as claimed in claim 1, said procedure also including withdrawing from said interlacing station successive coil strip sections formed at said interlacing station along a withdrawal path as successive coils of said coil row are interlaced with said backing strip at said interlacing station, and rotating the withdrawn coil strip sections around a withdrawal axis generally parallel to said withdrawal path.

8. In the procedure for producing a long coil strip formation as claimed in claim 7, each interlacing sequence in which the coil junction of a coil section brought to the interlacing station is wound around an associated backing strip section being accompanied by one revolution of a backing strip section around said strip axis and one revolution of a coil section around said coil path axis and by one revolution of the backing strip section around said withdrawal axis.

9. In the procedure for producing a long coil strip formation as claimed in claim 1, each interlacing sequence in which the coil junction of a coil section brought to the interlacing station is wound around an associated backing strip section being accompanied by one revolution of a backing strip section around said strip axis and one revolution of a coil section around said coil path axis.

References Cited in the file of this patent

UNITED STATES PATENTS

| Number | Name | Date |
|---|---|---|
| 136,473 | Ward | Mar. 4, 1873 |
| 198,833 | Barmore | Jan. 1, 1878 |
| 324,015 | Edge | Aug. 11, 1885 |
| 507,029 | Myers | Oct. 17, 1893 |
| 1,184,885 | Symrski | May 30, 1916 |
| 1,306,859 | Schneider | June 17, 1919 |
| 2,127,358 | Guba | Aug. 16, 1938 |
| 2,218,559 | Stephens | Oct. 22, 1940 |
| 2,350,723 | Buttner | June 6, 1944 |
| 2,351,923 | Buttner | June 20, 1944 |

FOREIGN PATENTS

| 663,450 | France | Aug. 21, 1929 |